US012561489B2

(12) United States Patent
Stahl et al.

(10) Patent No.: US 12,561,489 B2
(45) Date of Patent: Feb. 24, 2026

(54) METHOD OF DETERMINING THE ORIENTATION OF A THREE-DIMENSIONAL MODEL FOR ADDITIVE MANUFACTURING

(71) Applicant: DENTSPLY SIRONA Inc., York, PA (US)

(72) Inventors: Christian Stahl, Darmstadt (DE); Daniel Weiss, Heddesheim (DE)

(73) Assignee: Dentsply Sirona Inc., York, PA (US)

( * ) Notice: Subject to any disclaimer, the term of this patent is extended or adjusted under 35 U.S.C. 154(b) by 911 days.

(21) Appl. No.: 17/635,725

(22) PCT Filed: Aug. 21, 2020

(86) PCT No.: PCT/EP2020/073452
§ 371 (c)(1),
(2) Date: Feb. 16, 2022

(87) PCT Pub. No.: WO2021/032867
PCT Pub. Date: Feb. 25, 2021

(65) Prior Publication Data
US 2022/0284141 A1 Sep. 8, 2022

(30) Foreign Application Priority Data
Aug. 21, 2019 (EP) .................................... 19192934

(51) Int. Cl.
*G06F 30/10* (2020.01)
*B29C 64/124* (2017.01)
(Continued)

(52) U.S. Cl.
CPC ............ *G06F 30/10* (2020.01); *B29C 64/124* (2017.08); *B29C 64/386* (2017.08); *B33Y 50/00* (2014.12);
(Continued)

(58) Field of Classification Search
CPC ......... G06F 30/10; G06F 30/27; B33Y 50/00; B29C 64/124; B29C 64/386
See application file for complete search history.

(56) References Cited

U.S. PATENT DOCUMENTS

2015/0151492 A1 6/2015 Schmidt
2015/0154321 A1* 6/2015 Schmidt .................. B29C 64/40
700/98
(Continued)

FOREIGN PATENT DOCUMENTS

AU 2020333212 3/2022
BR 112022002485 6/2022
(Continued)

OTHER PUBLICATIONS

"Canadian Application Serial No. 3,150,600, Examiners Rule 86(2) Report mailed Aug. 11, 2025", 4 pgs.
(Continued)

*Primary Examiner* — Bijan Mapar
(74) *Attorney, Agent, or Firm* — SCHWEGMAN LUNDBERG & WOESSNER, P.A.

(57) ABSTRACT

A method of determining the orientation of a 3D Model to be generated by an additive manufacturing apparatus having a vat for holding photocurable material; and a platform for holding the 3D object corresponding to the 3D model. The platform is relatively movable with respect to the vat and the method includes a step of defining the surface geometry of the 3D model and the surface geometry includes surface segments $s_i$.

5 Claims, 1 Drawing Sheet

(51) Int. Cl.

| | |
|---|---|
| *B29C 64/386* | (2017.01) |
| *B33Y 50/00* | (2015.01) |
| *G06F 30/27* | (2020.01) |
| *G06F 113/10* | (2020.01) |
| *G06F 119/18* | (2020.01) |

(52) U.S. Cl.
CPC .......... *G06F 30/27* (2020.01); *G06F 2113/10* (2020.01); *G06F 2119/18* (2020.01)

(56) References Cited

U.S. PATENT DOCUMENTS

| | | | |
|---|---|---|---|
| 2015/0269289 A1* | 9/2015 | Kim ........................ | G06T 17/00 703/6 |
| 2016/0250810 A1* | 9/2016 | Lynch August ...... | B29C 64/393 700/98 |
| 2016/0370793 A1 | 12/2016 | Kobayashi | |
| 2017/0269575 A1* | 9/2017 | Halperin ................. | G06F 30/00 |

FOREIGN PATENT DOCUMENTS

| | | |
|---|---|---|
| CA | 3150600 | 2/2021 |
| CN | 108883468 | 11/2018 |
| CN | 110121735 | 8/2019 |
| CN | 114341860 | 4/2022 |
| EP | 2922029 | 9/2015 |
| EP | 3783520 | 2/2021 |
| JP | 2022545094 | 10/2022 |
| JP | 7536863 | 8/2024 |
| KR | 20220047833 | 4/2022 |
| WO | 2021032867 | 2/2021 |

OTHER PUBLICATIONS

"Chinese Application Serial No. 202080058860.4, Office Action mailed Dec. 25, 2024", W English Claims, 7 pgs.

"Korean Application Serial No. 10-2022-7008734, Notice of Preliminary Rejection mailed Jan. 23, 2025", W English Translation, 6 pgs.

"Korean Application Serial No. 10-2022-7008734, Response filed Mar. 7, 2025 to Notice of Preliminary Rejection mailed Jan. 23, 2025", w current English claims, 10 pgs.

"Chinese Application Serial No. 202080058860.4, Response filed Mar. 26, 2025 to Office Action mailed Dec. 25, 2024", w current English claims, 8 pgs.

"Chinese Application Serial No. 202080058860.4, Response filed Apr. 30, 2025 to Consultation by Telephone In Person-Response Needed mailed Apr. 28, 2025", W English Claims, 7 pgs.

"Australian Application Serial No. 2020333212, First Examination Report mailed Apr. 16, 2025", 4 pgs.

"International Application Serial No. PCT EP2020 073452, International Preliminary Report on Patentability mailed Mar. 3, 2022", 11 pgs.

"International Application Serial No. PCT EP2020 073452, International Search Report mailed Nov. 17, 2020", 4 pgs.

"International Application Serial No. PCT EP2020 073452, Written Opinion mailed Nov. 17, 2020", 9 pgs.

"European Application Serial No. 19192934.8, Extended European Search Report mailed Feb. 25, 2020", 10 pgs.

"European Application Serial No. 19192934.8, Response filed Aug. 24, 2021 to Extended European Search Report mailed Feb. 25, 2020", 22 pgs.

"European Application Serial No. 19192934.8, Communication Pursuant to Article 94(3) EPC mailed Dec. 21, 2023", 13 pgs.

"European Application Serial No. 19192934.8, Response filed Jun. 21, 2024 to Communication Pursuant to Article 94(3) EPC mailed Dec. 21, 2023", 23 pgs.

"Australian Application Serial No. 2020333212, Response filed Jul. 10, 2025 to First Examination Report mailed Apr. 16, 2025", w English Claims, 8 pgs.

Matos, Marina A, "A Multi-objective Approach to Solve the Build Orientation Problem in Additive Manufacturing", Springer Nature Switzerland AG 2019, ICCSA 2019, LNCS 11621, pp. 261-276, 2019., (Jun. 29, 2019), 41 pgs.

Paul, Alexander, "Part orientation and build cost determination in layered manufacturing", Computer-Aided Design, vol. 30. No. 5, (1998), 343-356.

* cited by examiner

METHOD OF DETERMINING THE ORIENTATION OF A THREE-DIMENSIONAL MODEL FOR ADDITIVE MANUFACTURING

CROSS-REFERENCE TO RELATED APPLICATIONS

This is a National Phase application of International Application No. PCT/EP2020/073452, filed Aug. 21, 2020, which claims the benefit of and priority to European Application Ser. No. 19192934.8, filed on Aug. 21, 2019, which are herein incorporated by reference for all purposes.

TECHNICAL FIELD OF THE INVENTION

The present invention relates to a method of additive manufacturing of a three-dimensional object. The present invention more specifically relates to a method of determining the orientation of a 3D Model to be generated through additive manufacturing.

BACKGROUND OF THE INVENTION

In additive manufacturing, a 3D object is printed layer-by-layer through light-induced curing of a liquid printing medium i.e., a liquid photocurable resin, which is selectively cured under the influence of UV radiation. In a commonly known variation of additive manufacturing, the 3D objects are preferably pulled by means of a platform, upside-down, out of the liquid photocurable material filled in a vat. Other variations of additive manufacturing are also known to those skilled in the art.

During the 3D printing, suitable support structures must be attached to the 3D object. The locations on the surface of the 3D object where the support structures must be attached depend on the geometry of the 3D object to be 3D printed and the orientation of the 3D object with respect to the building direction.

It is generally known in the art which points of a given geometry require support structures for a given orientation of the 3D object. For instance, US 2015/0151492 A1 discloses a method of generating support structures for a 3D object to be additively manufactured. Further reference is made to P. Alexander et al., "Part orientation and build cost determination in layered manufacturing", Computer-Aided Design, vol. 30, no. 5, pp 343-356, 1998, Elsevier Science Ltd. Furthermore, EP 2922029A2 discloses a system for visualizing a three dimensional (3D) model as printed from a 3D printer.

After the 3D printing, the cleaning and the thermal and/or photochemical post-curing of the 3D object, the support structures must be removed mechanically. The removal process is time-consuming and potentially leads to a change in the geometry of the printed 3D object e.g. when removing support residues with a rotary tool or when small nicks are caused by the support removal process. For dental components such as dental restorations, drilling templates, dental models, and the like with high quality requirements on shape accuracy, the consequences of mechanical post-processing can become critical.

SUMMARY

An objective of the present invention is to overcome the disadvantages of the prior art and provide a method of determining the orientation of a 3D Model to be generated by an additive manufacturing apparatus with consideration of local quality requirements of the resulting 3D object.

This objective has been achieved through the method as defined in claim 1. The dependent claims relate to further developments.

The present invention provides a method of determining the orientation of a 3D Model to be generated by an additive manufacturing apparatus comprising a vat for holding photocurable material and a platform for holding the 3D object corresponding to the 3D model, wherein the platform is relatively movable with respect to the vat. The method comprises the following steps:

1. Defining the surface geometry of the 3D model, wherein the surface geometry includes a plurality of surface segments $s_i$, where i denotes an integer, and $A_i$ denotes the surface area of the $i^{th}$ surface segment $s_i$. According to the present invention, the surface geometry of the 3D model is preferably represented by a triangulation, since triangulations are convenient for the calculations. Alternatively, other type of meshes with different geometry may be used.

2. Assigning, either manually by the user or automatically by a computer program, one or more weighing factors $f_i$ to the surface segments $s_i$ respectively, wherein the weighing factor $f_i$ is indicative of a degree of sensitivity of each of the surface segments $s_i$ for effects from removal of any support structure thereon. Preferably, the weighing factor $f_i$ is larger than 1 for surface segments $s_i$ which are considered as being sensitive against post-processing for removal of any support structure, and for all other surface segments $s_i$, $f_i$ is equal to 1

3. Defining an evaluation function $$R(\theta, \varphi) = -\frac{\sum_i f_i p_{supp,i}}{\sum_i A_i}$$

wherein $\theta$ and $\varphi$ respectively denote the polar and the azimuth orientation angles of the 3D object relative to the building direction, $p_{supp,i}$ denotes a probability indicative of the need of the individual surface segments $s_i$ to be supported through a support structure, and the summation denoted with $\Sigma$ extend over all surface segments $s_i$. The evaluation function R is normalized with the total surface area and has a negative overall sign. Alternative normalizations may be chosen. For example, normalizing by the sum of all support probabilities can provide a decoupling of the avoidance of support structures on sensitive surface segments from the reduction of the overall number of support structures.

4. Determining the orientation of the 3D model (1) relative to the platform based on the evaluation function R through optimization with respect to the polar and the azimuth angles, respectively, in order to avoid or reduce as much as possible support structures attaching to sensitive surface segments of the 3D model.

A major advantageous effect of the present invention is that through the determination of the orientation of the 3D model to be printed, the locations where support structures must be attached to the 3D model can be influenced. More specifically, through the determination of the orientation by optimizing the evaluation function R, support structures can be avoided or reduced in sensitive surface segments of the

3

3D model, and instead be located in other in-sensitive areas. Thereby possible surface artefacts due to mechanical post-processing can be avoided or reduced in sensitive surface segments, and the need for investing manual extra work for a precise removal of the support structures can be obviated or reduced as much as possible. Hence, the user can be refrained from accepting impairments of the manually reworked surfaces. Another major advantageous effect of the present invention is that through the assignment of the weighing functions ƒ, the process of removal of any support structure itself can be also influenced. In the case of dental components, surface segments of the 3D model to be printed where less sensitivity is required than in other parts, or surface segments where support structures can be removed more easily and/or quickly than in other parts, or surface segments where less damage is to be expected from manual post-processing than in other parts can be easily identified and considered in the assignment of the weighing factors ƒ. Another major advantageous effect of the present invention is that the method steps provide, thanks to the evaluation function R based on the weighing factors ƒ, an automatic algorithm for the avoidance of the attachment of support structures at such locations which, compared to other locations of the 3D model to be printed, have an increased need for protection against negative effects from mechanical post-processing. Thereby, the user is freed from manually orientating of the 3D object and/or placement of the support structures. Manual manipulation of the placement of the support structures requires the experience of the user, and is only possible to a limited extent, and thus can increase the risk of misprints. Therefore, another major advantageous effect of the present invention is that the risk of misprints can be reduced.

According to the present invention, the orientation of the 3D model to be printed is determined through optimizing the evaluation function R. Thus, at the optimal orientation of the 3D model, the evaluation functions must have an extremum. With the negative overall algebraic sign of the evaluation function R, the weighing factors ƒ>1 for sensitive surface segments and unity otherwise and positive probability values $p_{supp,i}$ as defined above, the optimal orientation is given by a maximum of the evaluation function R. Thereby, the present invention provides a precise algorithmic solution to find an optimized orientation with respect to the protection of surface segments that are sensitive against negative effects of the mechanical removal of support structed attached thereon.

I general, when the surface segments with the higher degree of sensitivity are arranged to be directed away from the building platform or oriented with small angles with respect to the building direction, then support structures to be located onto such surface segments can be avoided or reduced as much as possible. Such principle can be embodied in the present invention through several different evaluation functions R which can be used to determine the optimized orientation of the 3D model. In an embodiment, the probabilities $p_{supp,i}$ indicative of the need of the individual surface segments $s_i$ to be supported through a support structure are estimated by projecting the surface segments onto a plane parallel to the building platform:

$$p_{supp,i}=A_i\vec{n}_i(\theta,\varphi)\cdot\vec{e}_z$$

where $\vec{n}_i(\theta,\varphi)$ denotes the normal vector of the $i^{th}$ surface segment, θ and φ denote the polar and the azimuth angles of the 3D Model orientation, respectively, $\vec{e}_z$ denotes the unit vector perpendicular to the platform i.e. in building direction, "." denotes the scalar product. With this estimate of the support probabilities, the evaluation function is given by $$R(\theta,\varphi)=-\frac{\sum_i f_i A_i \vec{n}_i(\theta,\varphi)\cdot\vec{e}_z}{\sum_i A_i}$$

In an alternative embodiment, $$p_{supp,i}=A_i\max(0,\vec{n}_i(\theta,\varphi)\cdot\vec{e}_z)^n$$

and $$R(\theta,\varphi)=-\frac{\sum_i f_i A_i\max(0,\vec{n}_i(\theta,\varphi)\cdot\vec{e}_z)^n}{\sum_i A_i}$$

where max (a,b) denotes the maximum of the two values a, b and n is a real-valued exponent.

The present invention also provides a computer program having computer-readable codes for causing a CAM module to carry out the method steps. The present invention also provides a computer-readable storage which stores the computer program.

In the present invention, the computer program provides means for performing the assigning step, where weighing factors $f_i$ are assigned to each of the surface segments. In a first embodiment, the assignment is performed manually by a user through marking, on a display of the 3D model, one or more surface segments respectively with the desired weighing factors ƒ. In another embodiment, the assignment of weighting factors is performed by the CAD software that was used to design the 3D model to be printed. In the design process, the function of different surface regions of the model may be well-known, and the assigned weighting factors can be chosen according to the function of the respective surface segment corresponding to that region. For example, in dental applications, regions of dental restorations that are relevant for a proper fit of the restoration can be identified during the design process and be assigned with a high sensitivity against effects from removal of any support structure thereon.

In a preferred embodiment, the computer program makes use of a neural network for automating the assigning step, where weighing factors $f_i$ are assigned to each of the surface segments. In such an embodiment, the neural network can be used to classify feature regions of the 3D Model based on its local surface geometry. For example, if the 3D-Model represents a dental working model, suitable feature region labels could be tooth, gingiva, socket etc. Based on this classification, suitable weighing factors $f_i$ can be assigned to the surface segments belonging to a certain feature region. In the previous example of a dental working model, a possible suitable assignment would be a large factor corresponding to high sensitivity for segments belonging to "tooth" regions and a factor $f_i=1$ corresponding to no sensitivity for segments belonging to "socket" regions. For instance, the neural network can be trained with 3D models where feature regions have been identified either manually by the user or by the CAD software program.

BRIEF DESCRIPTION OF THE DRAWINGS

In the subsequent description, further aspects and advantageous effects of the present invention will be described in

Figure 1:
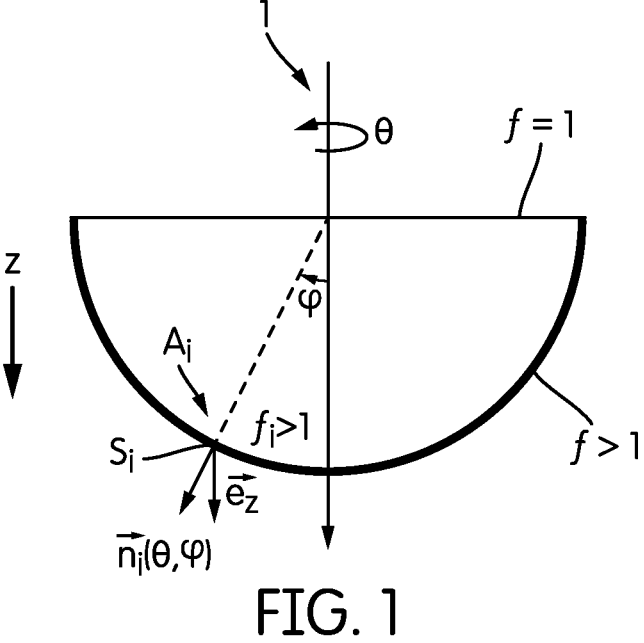
Figure 2:
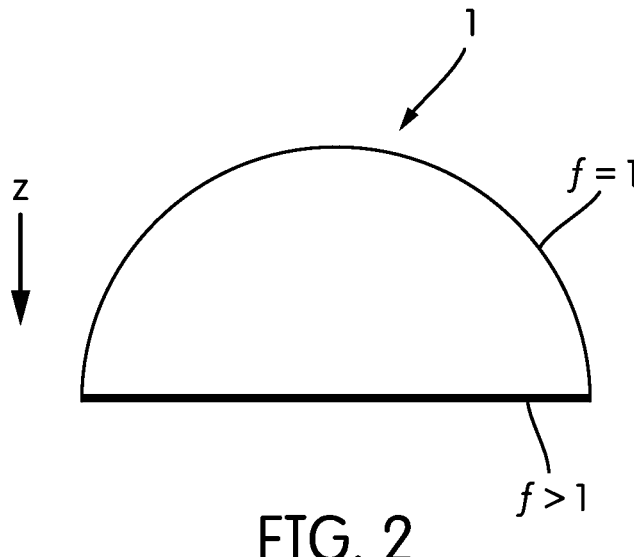

5 more detail by using exemplary embodiments and by referring to the drawings, wherein FIG. 1—is a schematic vertical cross-sectional view of a hemisphere as a 3D model according to an embodiment, wherein the curved surface indicated with the bold section has been assigned a weighing factor $f>1$ which is considered as being sensitive against post-processing;

FIG. 2—is a schematic vertical cross-sectional view of a hemisphere as a 3D model according to an alternative embodiment wherein the flat surface indicated with the bold section has been assigned a weighing factor $f>1$ which is considered as being sensitive against post-processing.

DETAILED DESCRIPTION OF THE INVENTION

The reference numbers shown in the drawings denote the elements as listed below and will be referred to in the subsequent description of the exemplary embodiments:

1. 3D Model
    i: Integer
    s: Surface segment
    $s_i$: $i^{th}$ surface segment
    $f$: Weighing factor,
    $f_i$: Weighing factor assigned to the $i^{th}$ surface segment
    $A_i$: Surface area of the $i^{th}$ surface segment
    $R(\theta,\varphi)$: Evaluation function
    $\theta$: Polar angle
    $\varphi$: Azimuth angle
    $\vec{n}_i$ $(\theta,\varphi)$: Normal vector of the $i^{th}$ surface segment
    $\vec{e}_z$: Unit vector in the vertical direction FIG. 1 is a schematic vertical cross-sectional view of a hemisphere as a 3D model (1) whose orientation has been determined through the method according to an embodiment of the present invention.

In a defining step of the method, the surface geometry of the 3D model (1) is initially defined. The surface geometry includes a plurality of surface segments $s_i$, where i is an integer. The surface geometry of the 3D model (1) is preferably represented by triangulation, where the $i^{th}$ surface segment is a triangle (not shown) with the surface area $A_i$. In a further defining step an evaluation function R is defined such that $$R = -\frac{\sum_i f_i p_{supp,i}}{\sum_i A_i}$$

The evaluation function R depends on weighing factors $f_i$ which indicate a degree of sensitivity of the surface segments $s_i$ respectively against effects from removal of any support structure and on $p_{supp,i}$ which denotes the probability that a surface segment $s_i$ will need to be supported through a support structure. The summations denoted with Σ extend over all surface segments $s_i$.

A shown in FIG. 1, the entire curved surface indicated with the bold section has been assigned a weighing factor $f>1$ which is considered as being sensitive against post-processing. The flat surface has been assigned a weighing factor $f=1$. In a determining step, the orientation of the 3D model (1) is determined relative to the building direction based on the evaluation function R with the assigned weighing factors $f$. In FIG. 1 the hemisphere i.e., the 3D model (1) is oriented in the optimized direction for which R is maximum. The 3D model (1) can be generated by an additive manufacturing apparatus (not shown). The additive manufacturing apparatus has a vat for holding a photocurable material, and a platform for holding the 3D object corresponding to the 3D model (1). The platform is relatively movable with respect to the vat. When generating the 3D model (1) with an additive manufacturing apparatus all support structure will be located on the flat surface, and thus the curved surface will be protected from effects arising from mechanical removal of the support structures.

FIG. 2 is a schematic vertical cross-sectional view of a hemisphere as a 3D model (1) according to an alternative embodiment. In this alternative embodiment, the curved surface indicated with the bold section has been assigned a weighing factor $f=1$. The flat surface has been assigned a weighing factor $f>1$ which is considered as being sensitive against effects arising from mechanical removal of the support structures. In FIG. 2, the hemisphere i.e., the 3D model (1) is oriented in the optimized direction for which R is maximum. When generating the 3D model (1) with an additive manufacturing apparatus all support structure will be located on the curved surface, and thus the flat surface will be protected from mechanical post-processing.

The above two exemplary embodiments in FIG. 1 and FIG. 2 have been chosen to demonstrate the invention by using a relatively simple 3D model (1). Of course, the method can be easily applied to more complex geometries like dental restorations and the like.

The invention claimed is:

1. A method of determining the orientation of a 3D Model to be generated by an additive manufacturing apparatus having: a vat for holding photocurable material; and a platform for holding the 3D object corresponding to the 3D model wherein the platform is relatively movable with respect to the vat, the method comprising:
    a step of defining the surface geometry of the 3D model, wherein the surface geometry includes a plurality of surface segments $s_i$, wherein i denotes an integer, and $A_i$ denotes the surface area of the $i^{th}$ surface segment $s_i$;
    the method further comprising:
    a step of assigning, either manually by the user or automatically by a computer program, one or more weighing factors $f_i$ to the surface segments $s_i$ respectively, wherein the weighing factor $f_i$ is indicative of a degree of sensitivity of each of the surface segments $s_i$ against effects arising from mechanical removal of any support structure thereon, wherein the weighing factor $f_i$ is larger than 1 for surface segments $s_i$ which are considered as being sensitive against effects mi sing from mechanical removal of any support structure, and for all other surface segments $s_i$, $f_i$ is equal to 1;
    a step of defining an evaluation function
    $$R(\theta, \varphi) = -\frac{\sum_i f_i p_{supp,i}}{\sum_i A_i}$$
    wherein $\theta$ and $\varphi$ respectively denote the polar and, the azimuth angles of the 3D object relative to the building direction, $p_{supp,i}$ denotes a probability indicative of the need of the individual surface segments $s_i$ to be supported through a support structure, and, the summations denoted with Σ extend over all surface segments $s_i$ and
    a step of determining the orientation of the 3D model relative to the building direction based on the evaluation function R through optimization with respect to the polar and the azimuth angles $\theta$ and $\varphi$, respectively, to avoid or reduce as a need of support structures in sensitive surface segments of the 3D model;

wherein in the evaluation function $$p_{supp,i}=A_i\vec{n}_i(\theta,\varphi)\cdot\vec{e}_z$$

$\bar{n}_i(\theta,\varphi)$ denotes the normal vector of the $i^{th}$ surface segment $s_i$, $\bar{e}_z$ denotes the unit vector in the vertical direction perpendicular to the platform and pointing in the building direction, and "•" denotes the scalar product;

wherein the evaluation function R directly controls support structure placement by the additive manufacturing apparatus during the layer-by-layer printing process;

a step of automatically controlling the additive manufacturing apparatus based on the determined orientation to physically position the 3D object on the platform according to the optimized polar and azimuth angles $\theta$ and $\varphi$; and a step of automatically generating, by the additive manufacturing apparatus, support structures at locations determined by the optimized orientation, wherein the support structures are positioned to avoid attachment to surface segments $s_i$ having weighing factors $f$i>1.

2. The method according to claim 1, wherein the surface geometry of the 3D model is represented by triangulation, where the $i^{th}$ surface segment $s_i$ is a triangle with the surface area $A_i$.

3. The method according claim 1, wherein the assigning step is performed manually by the user through marking, on a display of the 3D model, one or more surface segments $s_i$ respectively with weighing factors $f_i$.

4. The method according to claim 1, wherein the assigning step is performed through a computer program which comprises a neural network which has been trained for classifying regions of the 3D models based on its local surface geometry and assigns weighing factors $f_i$ to the surface segments based on the region classification.

5. A non-transitory computer-readable storage medium which stores the computer-program according to claim 1.

\* \* \* \* \*